(12) United States Patent
Endo et al.

(10) Patent No.: US 9,130,420 B2
(45) Date of Patent: Sep. 8, 2015

(54) STATOR HAVING A PLURALITY OF STATOR CORE SEGMENTS AND ROTATING ELECTRIC MACHINE INCLUDING SAME

(75) Inventors: Yasuhiro Endo, Toyota (JP); Masao Okumura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 530 days.

(21) Appl. No.: 13/520,312

(22) PCT Filed: Jan. 19, 2010

(86) PCT No.: PCT/JP2010/050527
§ 371 (c)(1),
(2), (4) Date: Jul. 2, 2012

(87) PCT Pub. No.: WO2011/089685
PCT Pub. Date: Jul. 28, 2011

(65) Prior Publication Data
US 2012/0306311 A1  Dec. 6, 2012

(51) Int. Cl.
*H02K 1/18* (2006.01)
*H02K 1/14* (2006.01)
(52) U.S. Cl.
CPC ............... *H02K 1/185* (2013.01); *H02K 1/148* (2013.01)
(58) Field of Classification Search
CPC ............ H02K 1/12; H02K 1/14; H02K 1/18; H02K 1/185; H02K 5/04
USPC ............. 310/216.008, 216.055, 216.057, 310/216.058, 216.061, 420, 422, 423, 427, 310/431–433
See application file for complete search history.

(56) References Cited

U.S. PATENT DOCUMENTS

| 4,837,471 | A  | * | 6/1989 | Kostoss et al. ................. 310/89 |
| 6,346,760 | B1 | * | 2/2002 | Boardman, IV ....... 310/216.007 |
| 2002/0079781 | A1 | * | 6/2002 | Walko et al. .................. 310/258 |

FOREIGN PATENT DOCUMENTS

| JP | 11-341717 | A | 12/1999 |
| JP | 2003-264944 | A | 9/2003 |
| JP | 2005-51941 | A | 2/2005 |
| JP | 2007-259581 | A | 10/2007 |
| JP | 2008-312304 | A | 12/2008 |
| JP | 2009-60760 | A | 3/2009 |
| JP | 2009-118634 | A | 5/2009 |
| JP | 2009-153268 | A | 7/2009 |
| JP | 2009-291003 | A | 12/2009 |

OTHER PUBLICATIONS

International Search Report for PCT/JP2010/050527 dated Apr. 20, 2010.

* cited by examiner

*Primary Examiner* — Michael Andrews
(74) *Attorney, Agent, or Firm* — Sughrue Mion, PLLC

(57) ABSTRACT

Provided is a stator that can reduce iron loss and ensure a fastening force for stator core segments. The stator of a generally hollow cylindrical shape includes a plurality of stator core segments arranged adjacent to one another in a circumferential direction of the stator and each having an outer surface on the outer side in a radial direction of the stator, and the same number of curved members as the stator core segments, the curved members extending in the circumferential direction, and each having a projecting portion curved to project toward the outer surface, contacting the outer surface and pressing the outer surface inward in the radial direction of the stator.

6 Claims, 5 Drawing Sheets

STATOR HAVING A PLURALITY OF STATOR CORE SEGMENTS AND ROTATING ELECTRIC MACHINE INCLUDING SAME

CROSS REFERENCE TO RELATED APPLICATIONS

This application is a National Stage of International Application No. PCT/JP2010/050527 filed Jan. 19, 2010, the contents of which are incorporated herein by reference in their entirety.

TECHNICAL FIELD

The present invention relates a stator and a rotating electric machine, and more particularly relates to a stator including a plurality of stator core segments and a rotating electric machine including that stator.

BACKGROUND ART

Conventionally, various techniques for a plurality of stator core segments have been proposed. For example, Japanese Patent Laying-Open No. 2009-118634 (PTL 1) proposes a rotating electric machine including core segments and a ring mounted on the outer circumference of the core segments, and including at least two or more projecting portions at a coupling section between adjacent core segments and at least one or more air gaps.

Japanese Patent Laying-Open No. 2009-153268 (PTL 2) proposes a structure, in a brush-less motor including a plurality of teeth and including a stator core, on the outer circumference of which a lightening hole extending in the axial direction is provided as a recess, wherein core segments are assembled to constitute the stator core and the stator core is press fit fixed within a casing, and a notch groove is formed in the axial direction in the inner circumferential surface in the casing.

Moreover, Japanese Patent Laying-Open No. 2007-259581 (PTL 3) proposes a stator wherein a yoke unit of each core segment is provided with a recess on its outer circumferential surface on the outer side of the motor radial direction, and a plurality of protrusions to be fitted within the recesses are provided in the inner circumferential surface of a holding ring.

CITATION LIST

Patent Literature

PTL 1: Japanese Patent Laying-Open No. 2009-118634
PTL 2: Japanese Patent Laying-Open No. 2009-153268
PTL 3: Japanese Patent Laying-Open No. 2007-259581

SUMMARY OF INVENTION

Technical Problem

In the stator disclosed in Japanese Patent Laying-Open No. 2009-118634 (PTL 1), the plurality of stator core segments are fastened by a shrink fit ring which uniformly contacts their outer circumferential surfaces. A stress exerted on the stator core segments from this ring has a high value on average on the whole outer circumferential surface of stator core segments, resulting in a large iron loss. Since the iron loss increases in the area of stator core segments to which a compression stress is applied, the iron loss in the stator core segments increases as a whole, with a stress being applied to the whole stator core segments on average from the outer circumferential side.

On the other hand, in the case where part of the ring contacts the outer circumferential surface of the stator core segments as in the stator disclosed in Japanese Patent Laying-Open No. 2009-153268 (PTL 2), the iron loss is reduced, but a problem arises in that a fastening force on the stator core segments by the ring is less likely to be achieved.

The present invention was made in view of the above-described problems, and has a main object to provide a stator that can reduce the iron loss and can ensure the fastening force for stator core segments.

Solution To Problem

A stator according to the present invention is a stator of a generally hollow cylindrical shape, including a plurality of stator core segments. The stator core segments are arranged adjacent to one another in a circumferential direction of the stator. The stator core segments each have an outer surface on the outer side of the stator in a radial direction. The stator also includes the same number of curved members as the stator core segments. The curved members extend in the circumferential direction. The curved members each have a projecting portion curved to project toward the outer surface. The curved members each contact the outer surface and press the outer surface inward in the radial direction of the stator.

Preferably, in the above-described stator, a recess is formed in the outer surface of the stator core segment. The curved members each have the projecting portion received in the recess and contact the outer surface in the recess.

Preferably, in the above-described stator, the recess is formed at a central portion in the circumferential direction of the outer surface of the stator core segment.

Preferably, in the above-described stator, the curved members extend in an axial direction of the stator.

Preferably, the above-described stator further includes a link member linking a plurality of the curved members. The curved members have axial ends and are arranged such that the axial ends do not contact the stator core segments. The link member is coupled to the axial ends.

A rotating electric machine according to the present invention includes a rotation shaft provided rotatably, a rotor provided fixedly to the rotation shaft, and a stator of any of the above-described aspects arranged around the rotor.

Advantageous Effects Of Invention

According to the stator of the present invention, the iron loss can be reduced, and the fastening force for the stator core segments can be ensured.

DESCRIPTION OF EMBODIMENTS

Hereinbelow, embodiments of the present invention will be described based on the drawings. It is noted that, in the following drawings, the same reference number denotes same or corresponding parts, and description thereof will not be repeated.

First Embodiment

Figure 1:
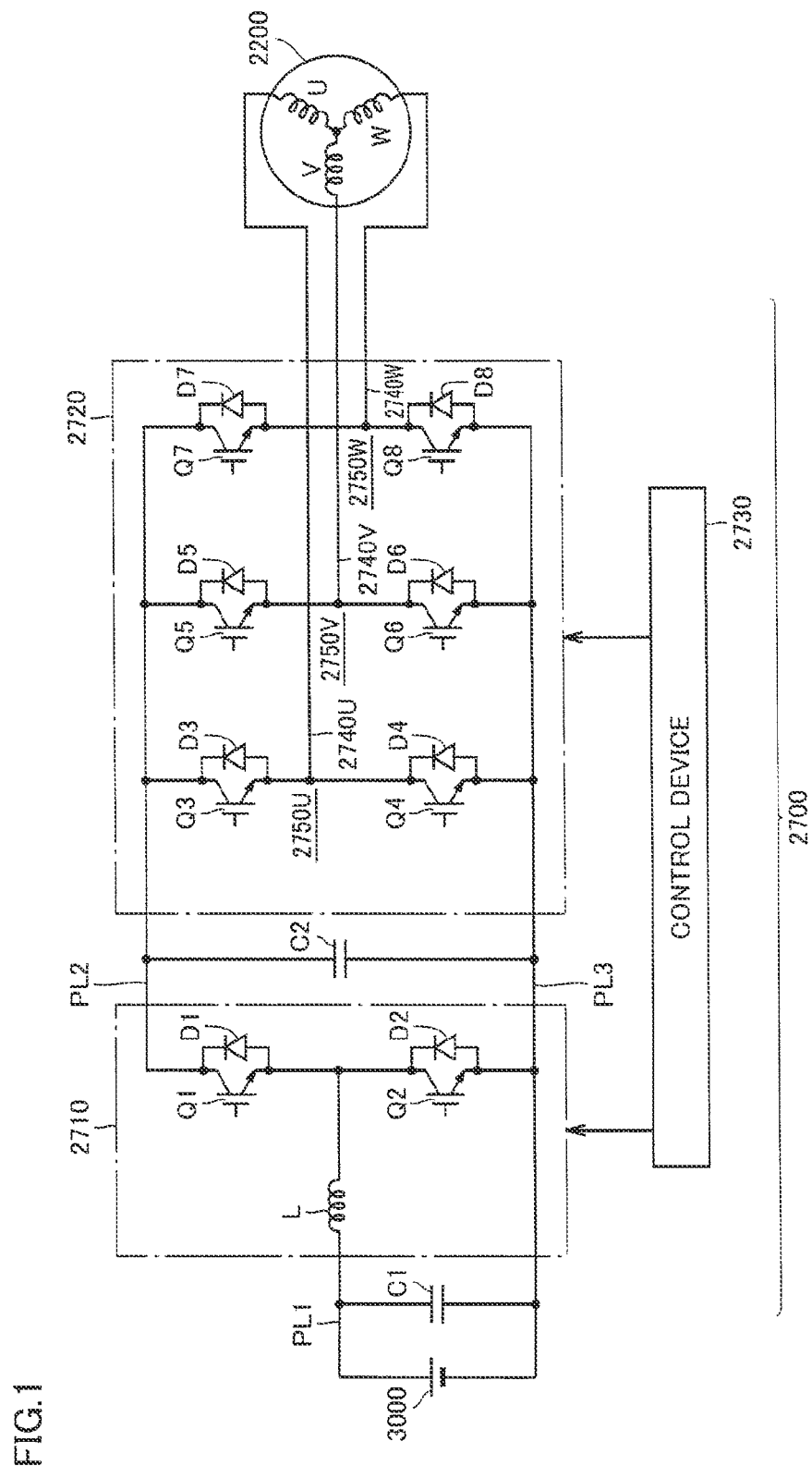
FIG. 1 is a diagram for explaining a structure of a drive unit of a vehicle equipped with a rotating electric machine including a rotor according to a first embodiment of the present invention.

FIG. 1 is a diagram for explaining a structure of a drive unit of a vehicle equipped with a rotating electric machine 2200 including a rotor 120 according to the first embodiment of the present invention. FIG. 1 shows an electric circuit for driving rotating electric machine 2200 mounted on the vehicle according to the present invention. Referring to FIG. 1, a PCU (Power Control Unit) 2700 includes a converter 2710, an inverter 2720, a control device 2730, capacitors C1, C2, power source lines PL1 to PL3, and output lines 2740U, 2740V, 2740W. Converter 2710 is connected between a battery 3000 and inverter 2720, and inverter 2720 is connected to rotating electric machine 2200 with output lines 2740U, 2740V and 2740W.

Battery 3000 connected to converter 2710 is, for example, a nickel-metal hydride, lithium ion or similar secondary battery. Battery 3000 supplies a generated DC voltage to converter 2710, and is charged with a DC voltage received from converter 2710.

Converter 2710 includes power transistors Q1, Q2, diodes D1, D2, and a reactor L. Power transistor Q1, Q2 are connected in series across power source lines PL2 and PL3, and receive, at their bases, a control signal from control device 2730. Diodes D1, D2 are connected between the collector and the emitter of power transistors Q1, Q2, respectively, such that an electric current flows from the emitter to the collector of power transistors Q1, Q2, respectively. Reactor L has its one end connected to power source line PL1 connected to the positive electrode of battery 3000, and its other end connected to the connection point of power transistors Q1, Q2.

This converter 2710 boosts a DC voltage received from battery 3000 using reactor L, and supplies the boosted voltage as boosted to power source line PL2. Converter 2710 also steps down a DC voltage received from inverter 2720 to charge battery 3000.

Inverter 2720 includes a U-phase arm 2750U, a V-phase arm 2750V and a W-phase arm 2750W. The respective phase arms are connected in parallel across power source lines PL2 and PL3. U-phase arm 2750U includes power transistors Q3, Q4 connected in series, V-phase arm 2750V includes power transistors Q5, Q6 connected in series, and W-phase arm 2750W includes power transistors Q7, Q8 connected in series. Diodes D3 to D8 are connected between the collector and the emitter of power transistors Q3 to Q8, respectively, such that an electric current flows from the emitter to the collector of power transistors Q3 to Q8, respectively. The connection points of the respective power transistors in the respective phase arms are connected to the opposite side of the neutral points of the respective phase coils of rotating electric machine 2200 as a motor-generator with output lines 2740U, 2740V and 2740W, respectively.

Inverter 2720 converts a DC voltage received from power source line PL2 into an AC voltage based on a control signal from control device 2730 for output to rotating electric machine 2200. Inverter 2720 also rectifies an AC voltage generated by rotating electric machine 2200 to a DC voltage for supply to power source line PL2.

Capacitor C1 is connected across power source lines PL1 and PL3, and smoothes the voltage level of power source line PL1. Capacitor C2 is connected across power source lines PL2 and PL3, and smoothes the voltage level of power source line PL2.

Control device 2730 calculates each phase coil voltage of rotating electric machine 2200 based on a motor torque command value, each phase current value of rotating electric machine 2200, and an input voltage to inverter 2720, and based on the calculated result, generates a PWM (Pulse Width Modulation) signal that turns on/off power transistors Q3 to Q8 for output to inverter 2720.

Control device 2730 also calculates a duty ratio of power transistors Q1, Q2 for optimizing the input voltage to inverter 2720 based on the above-described motor torque command value and the motor speed, and based on the calculated result, generates a PWM signal that turns on/off power transistors Q1, Q2 for output to converter 2710.

Further, control device 2730 controls the switching operation of power transistors Q1 to Q8 in converter 2710 and inverter 2720 so as to convert AC power generated by rotating electric machine 2200 into DC power to charge battery 3000.

In PCU 2700, converter 2710 boosts a DC voltage received from battery 3000 based on a control signal from control device 2730 for supply to power source line PL2. Inverter 2720 receives, from power source line PL2, a DC voltage smoothed by capacitor C2, and converts the received DC voltage into an AC voltage for output to rotating electric machine 2200.

Inverter 2720 also converts an AC voltage generated by the regenerative operation of rotating electric machine 2200 into a DC voltage for output to power source line PL2. Converter 2710 receives a DC voltage smoothed by capacitor C2 from power source line PL2, and steps down the received DC voltage to charge battery 3000.

Figure 2:
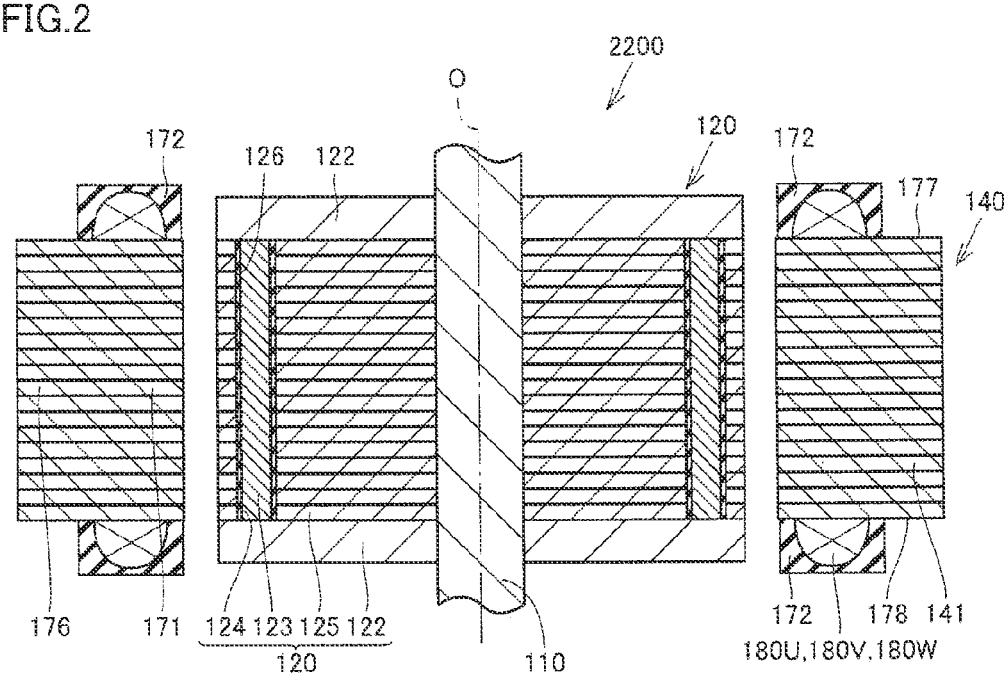
FIG. 2 is a side sectional view showing a schematic structure of the rotating electric machine shown in FIG. 1.

FIG. 2 is a side sectional view showing a schematic structure of rotating electric machine 2200 shown in FIG. 1. As shown in FIG. 2, rotating electric machine 2200 includes a rotation shaft 110 provided rotatably about a rotational centerline O, rotor 120 provided fixedly to rotation shaft 110 and provided rotatably with rotation shaft 110, and an annular stator 140 arranged around rotor 120. This rotating electric machine 2200 is typically mounted on a hybrid vehicle, and functions as a drive source that drives wheels and as a generator that generates electricity from motive power of the engine or the like. Further, rotating electric machine 2200 is also applicable to an electric vehicle that runs only with electrical power without having an engine, and a fuel cell vehicle including, as a vehicle-mounted power source, a fuel cell that generates electrical energy using fuel.

Rotor 120 includes a rotor core 125 of a substantially cylindrical shape with a magnet insertion hole 126 as an example of a hole extending in an axial direction formed therein. Rotor 120 also includes a permanent magnet 123 inserted and embedded in magnet insertion hole 126. Permanent magnet 123 extends in the axial direction of rotor core 125. Rotor 120 also includes an end plate 122 provided at the end face of rotor core 125 in the axial direction. Permanent magnet 123 is secured by means of a resin 124 that fills magnet insertion hole 126. Rotating electric machine 2200 is an IPM (Interior Permanent Magnet) motor with permanent magnet 123 embedded within rotor core 125.

Stator 140 is formed in a generally hollow cylindrical shape, and includes a stator core formed annularly so as to surround rotor 120, as well as a U-phase coil 180U, a V-phase coil 180V and a W-phase coil 180W wound around and mounted on this stator core. An insulating mold resin 172 is provided at axial end faces 177, 178 of this stator 140. Axial end faces 177, 178 of stator 140 are covered with mold resin 172. This mold resin 172 includes, for example, thermosetting resin such as BMC (Bulk Molding Compound) or epoxy resin, thermoplastic resin such as PPS (Polyphenylene Sulfide) or PBT (Polybutylene Terephthalate), or the like.

Figure 3:
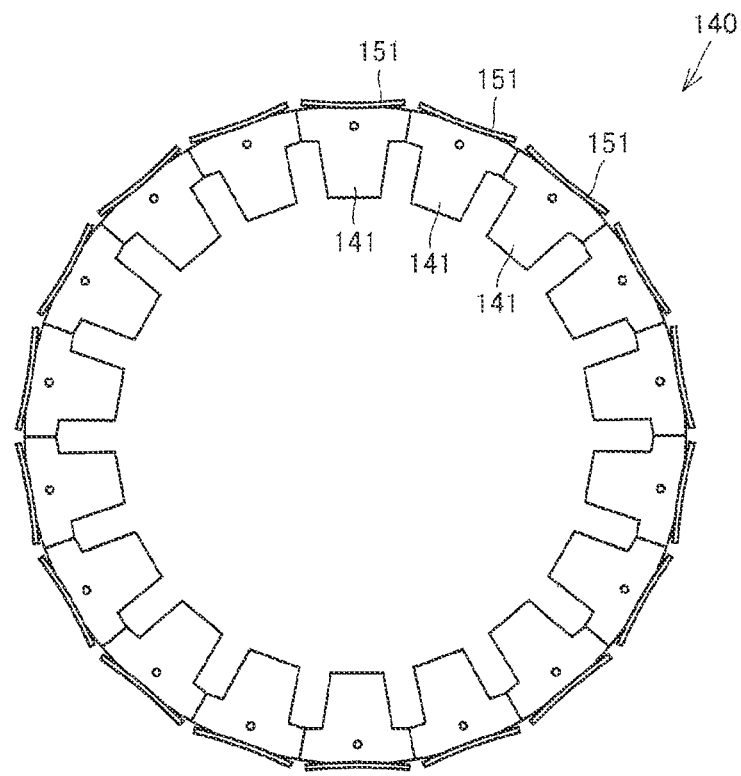
FIG. 3 is a plan view of a stator as viewed two-dimensionally from the direction of a rotational centerline.
Figure 4:
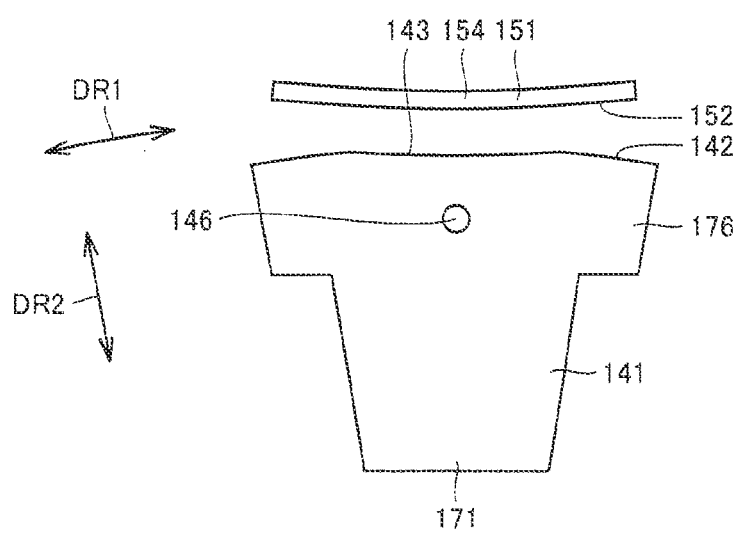
FIG. 4 is an exploded view enlargedly showing a set of a stator core segment and a curved member.

FIG. 3 is a plan view of stator 140 as viewed two-dimensionally from the direction of a rotational centerline O. FIG. 4 is an exploded view enlargedly showing a set of a stator core segment 141 and a curved member 151. Stator 140 includes a plurality of stator core segments 141 as shown in FIG. 3. Stator core segments 141 are divided in a circumferential direction DR1 of stator 140, and are arranged adjacent to one another. Stator core segments 141 may be formed by stacking a plurality of electromagnetic steel plates, or may be formed by a dust core.

As shown in FIG. 4 in detail, stator core segments 141 include annular yoke portions 176 annularly extending in circumferential direction DR1 of stator 140 and a plurality of stator teeth 171 each projecting inward in a radial direction DR2 of stator 140 from the inner circumferential surface of this yoke portion 176. Stator teeth 171 are formed at regular intervals in circumferential direction DR1 of annular yoke portions 176. Of the surfaces of yoke portion 176, the circumferential end faces arranged in circumferential direction DR1 of stator 140 are in contact with the circumferential end faces of other stator core segments 141 adjacent to stator core segment 141 concerned in the circumferential direction of stator 140.

A slot is provided between stator teeth 171 of stator core segments 141 adjacent to each other in the circumferential direction. Coils (a U-phase coil 180U, a V-phase coil 180V and a W-phase coil 180W) are mounted on stator core segments 141 so as to be wound around stator teeth 171 in the slots. The coils are mounted on stator teeth 171 of stator core segments 141 with an insulator that ensures insulation between stator core segments 141 and the coils interposed therebetween.

Stator core segment 141 has an outer surface 142 which is an outer surface of stator 140 in radial direction DR2. Outer surface 142 has a recess 143 formed therein by the central portion of outer surface 142 in circumferential direction DR1 being partly recessed. Provided in the vicinity of the center of yoke portion 176 of stator core segment 141 in circumferential direction DR1 is a caulking site 146 formed in stator core segment 141 of stator 140 in the axial direction (in the direction perpendicular to the sheet of FIG. 4). Stator core segment 141 is improved in strength by forming caulking site 146.

Stator 140 also includes curved members 151 arranged at the outer circumferential side of stator core segments 141 arranged cylindrically. The same number of curved members 151 as stator core segments 141 are provided. Plurality of curved members 151 are arranged adjacent to one another in circumferential direction DR1 of stator 140. Curved member 151 extends in circumferential direction DR1 of stator 140. Curved member 151 is formed such that the size of curved member 151 in circumferential direction DR1 is smaller than the size of yoke portion 176 of stator core segment 141 in circumferential direction DR1.

Curved member 151 is curved to project toward outer surface 142. Curved member 151 of the first embodiment has a projecting portion 154 in the vicinity of its center in circumferential direction DR1 which is formed to project toward outer surface 142 of stator core segment 141. A surface 152 of curved member 151 facing stator core segments 141 is most adjacent to outer surface 142 of stator core segment 141 in the vicinity of projecting portion 154.

Figure 5:
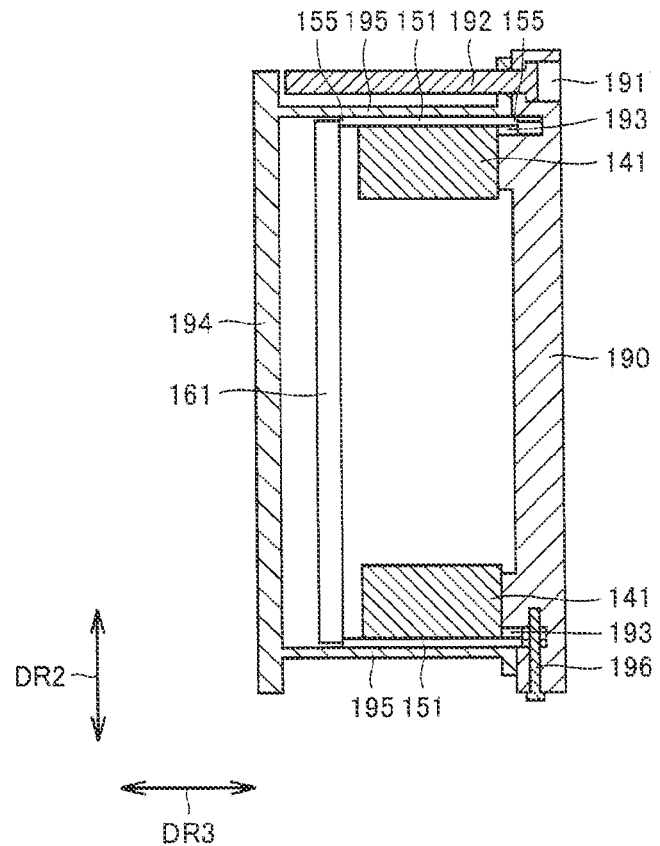
FIG. 5 is a schematic sectional view showing the state where a stator of a first embodiment is stored in a casing.

FIG. 5 is a schematic sectional view showing the state where stator 140 of the first embodiment is stored in a casing 190. FIG. 5 illustrates the state where stator 140 shown in FIG. 3 formed by plurality of stator core segments 141 arranged annularly is fitted in casing 190 and has its outer circumference surrounded by a covering 194. As shown in FIG. 5, one ends in axial direction DR3 of stator core segments 141 arranged annularly are in contact with casing 190, and the other ends of stator core segments 141 in axial direction DR3 are covered by covering 194. Casing 190 has a screw hole 191 formed therein. By providing a bolt 192 through this screw hole 191, casing 190 and covering 194 are assembled integrally.

Casing 190 also has an annular groove portion 193 formed therein. Of the surfaces of casing 190, groove portion 193 is provided in a surface on which stator 140 is mounted. Curved member 151 extends in axial direction DR3 of stator 140, and one of axial ends 155 which are ends of curved member 151 in axial direction DR3 is located within groove portion 193. Curved member 151 is formed extending in axial direction DR3 such that axial ends 155 do not contact stator core segments 141.

Figure 6:
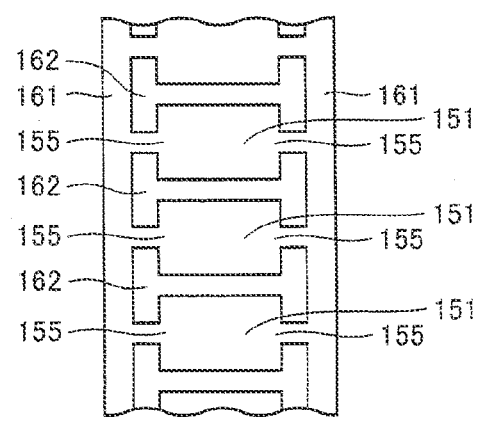
FIG. 6 is a developed view showing a configuration of a structure of a curved member and a link member.

A link member 161 is coupled to axial ends 155 of curved member 151. FIG. 6 is a developed view showing a configuration of a structure of curved member 151 and link member 161. As shown in FIG. 6, stator 140 further includes link member 161. Link member 161 links plurality of curved members 151 in circumferential direction DR1. Curved member 151 has axial ends 155. Link member 161 is coupled only to portions of axial ends 155 of curved member 151, and air gaps 162 are left between adjacent curved members 151 to provide such a configuration that link member 161 does not prevent deformation of curved member 151 adjacent thereto. The structure shown in FIG. 6 can be obtained, for example, by bending a plate material while punching by a press.

As shown in FIG. 5, a bolt 196 is provided so as to penetrate link member 161 coupled to axial ends 155 of curved members 151 on the side located in groove portion 193. By providing bolt 196 to penetrate casing 190 and link member 161, curved member 151 is positioned relative to stator core segment 141.

Covering 194 includes a cylindrical wall 195 surrounding the outer circumference of stator 140. The inner surface of wall 195 faces outer surface 142 of stator core segment 141. Curved member 151 is arranged between wall 195 and stator core segment 141. Curved member 151 is interposed between stator core segment 141 and wall 195. Since curved member 151 is curved relative to circumferential direction DR1 as shown in FIG. 4, projecting portion 154 constituting part of curved member 151 contacts stator core segment 141, and another part of curved member 151 contacts wall 195.

Part of outer surface 142 of stator core segment 141 other than recess 143 is formed in an arc shape. The inner surface of cylindrical wall 195 is formed in a circular shape concentric with the above described arc shape. Curved member 151 has a curved shape so as to protrude toward outer surface 142, and when arranged between stator core segment 141 and wall 195, it is deformed so as to be reduced in size in radial direction DR2. Curved member 151 is sandwiched by stator core segment 141 and wall 195 in a flexed state.

By this flection of curved member 151, an elastic force occurs in radial direction DR2 of stator 140. Accordingly, curved member 151 exerts an inward stress in radial direction DR2 on stator core segment 141. Curved member 151 also exerts an outward stress in radial direction DR2 on wall 195. Curved member 151 presses stator core segment 141 inward in radial direction DR2, and presses wall 195 outward in radial direction DR2. Curved member 151 has a function as a plate spring that exerts an elastic force in both the directions in radial direction DR2. By the elastic force of this curved member 151, both stator core segment 141 and wall 195 are pressed and held in radial direction DR2.

In the example shown in FIG. 5, bolt 192 is used for fixing casing 190 and covering 194. In the case of fixing stator core segments by a conventional shrink fit ring, the shrink fit ring exerts a stress only inward in the radial direction, so that a bolt for fixing the stator core segments to the casing on the radially outer side is indispensable.

In contrast, with stator 140 of the present embodiment, curved member 151 exerts a holding force for fixing stator 140 to wall 195 as a peripheral wall on the outer side in radial direction DR2, in addition to the fastening force for the stator core segments. Therefore, when covering 194 is sufficiently fixed to stator 140 by the elastic force exerted by curved member 151, rotating electric machine 2200 may not include bolt 192 for fixation. In this case, the number of components of rotating electric machine 2200 can be reduced, and bolt fastening for assembling stator 140 is eliminated, which can simplify the manufacturing process.

Alternatively, curved member 151 may be formed so as to have portions in the vicinity of axial ends 155 being curved locally relative to axial direction DR3 to have curves in two perpendicular directions of circumferential direction DR1 and axial direction DR3. Since portions in the vicinity of axial ends 155 are curved inward in radial direction DR2 to come close to outer surface 142 of stator core segment 141, assemblability of curved member 151 can be improved. For example, if portions in the vicinity of axial ends 155 of curved member 151 are curved when curved member 151 is going to be fitted into groove portion 193 formed in casing 190 shown in FIG. 5, curved member 155 can easily be moved into groove portion 193.

Figure 7:
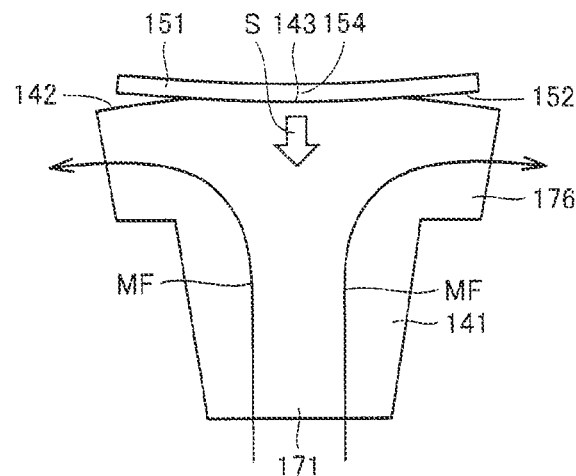
FIG. 7 is a schematic view showing stress and magnetic flux exerted on a stator core segment.

FIG. 7 is a schematic view showing a stress S and a magnetic flux MF exerted on stator core segment 141. In curved member 151 sandwiched between stator core segment 141 and wall 195 of covering 194, projecting portion 154 is received in recess 143 formed in stator core segment 141, as shown in FIG. 7. Since part of curved member 151 is received in recess 143 formed in outer surface 142, curved member 151 can easily be positioned relative to stator core segment 141 in circumferential direction DR1 of stator 140, which can reduce an error in arranging curved member 151 in circumferential direction DR1.

With stator 140 of the present embodiment, link member 161 shown in FIGS. 5 and 6 is provided to define the relative position of each curved member 151 in circumferential direction DR1. Therefore, positioning of curved member 151 in circumferential direction DR1 is even easier. Moreover, in a single step of disposing one structure in which plurality of curved members 151 are provided integrally, plurality of curved members 151 can be assembled, and each curved member 151 does not need to be arranged on the outer side of stator core segment 141 in radial direction DR2. Therefore, manufacturing of stator 140 can be facilitated, and the manufacturing cost of stator 140 can be reduced.

Curved member 151 contacts the center of outer surface 142 of stator core segment 141 in recess 143, and presses outer surface 142 inward in radial direction DR2 of stator 140. With curved member 151 pressing stator core segment 141, compression stress S inward in radial direction DR2 indicated by a hollow arrow in FIG. 7 is exerted within stator core segment 141. With compression stress S inward in radial direction DR2 exerted by curved member 151, the fastening force for stator core segment 141 can be ensured. Since projecting portion 154 of curved member 151 is received in recess 143 and the compression stress is exerted on recess 143 from projecting portion 154, the stress can be effectively transferred to stator core segment 141 from curved member 151. Stator core segment 141 is fixed by curved member 151 that partially pressurizes part of outer surface 142 of stator core segment 141 in the radially inner direction, so that cylindrical stator 140 is formed.

Curved members 151 adjacent to one another corresponding to stator core segments 141 adjacent to one another in circumferential direction DR1 are provided such that portions each facing outer surface 142 in axial direction DR3 of stator 140 are not coupled to one another. Therefore, each curved member 151 can be flexed independently for each stator core segment 141. If each curved member 151 is not independent, the flexing amount of curved member 151 will be restricted, and the fastening force for stator core segments 141 may be insufficient. In the present embodiment, however, curved members 151 are flexed independently, so that the compression stress can be uniformly applied to each stator core segment 141, and a sufficient fastening force can be ensured.

Moreover, since curved member 151 has a plate-like shape extending in both circumferential direction DR1 and axial direction DR3, the rigidity of curved member 151 in axial direction DR3 is increased. Since the fastening force exerted on stator core segments 141 from curved member 151 can thereby be increased without damaging curved member 151, a stronger fastening force for stator core segments 141 can be obtained.

Curved member 151 only contacts recess 143 formed at the central portion of outer surface 142 in circumferential direction DR1, and the position of outer surface 142 in circumferential direction DR1 at which curved member 151 contacts is defined. Therefore, the compression stress exerted on stator core segments 141 has a distribution in circumferential direction DR1. That is, the compression stress is the highest in the vicinity of the central portion in circumferential direction DR1, and the compression stress is the smallest in the vicinity of the ends in circumferential direction DR1. Since stress concentration occurs in the vicinity of the central portion in circumferential direction DR1 within yoke portion 176 of stator core segment 141, the compression stress produced in the vicinity of the ends in circumferential direction DR1 is small although the compression stress produced at the central portion in circumferential direction DR1 is large.

Therefore, the compression stress exerted on stator core segments 141 from curved member 151 is reduced in stator core segments 141 as a whole, as compared to conventional stator core segments with a ring contacting all over the outer surface in the circumferential direction. Although the compression stress exerted on stator core segments 141 as a whole is obtained as an integration value of the compression stress exerted on each portion of stator core segment 141, the compression stress exerted on stator core segments 141 is reduced as a whole since the area on which a high compression stress is exerted is small and the area on which a low compression stress is exerted is large.

When the compression stress exerted on stator core segments 141 increases, the iron loss increases. The iron loss can be reduced by relieving the compression stress exerted on stator core segments 141. In stator 140 of the present embodiment, a high compression stress is applied only to a portion in circumferential direction DR1, and the compression stress exerted on overall stator core segment 141 is reduced, so that the iron loss produced in stator core segments 141 can be reduced.

In addition, the magnetic flux within stator core segment 141, as indicated by an arrow MF in FIG. 7, passes through stator teeth 171 from the inner side in radial direction DR2 to reach yoke portion 176, and flows in yoke portion 176 toward the ends in circumferential direction DR1, then into other adjacent stator core segments 141 through the circumferential end faces of yoke portion 176. Therefore, within stator core segments 141, the flux density becomes small in the vicinity of the central portion in circumferential direction DR1 where the highest stress is exerted from curved member 151.

In other words, since recess 143 is formed at the central portion of outer surface 142 of stator core segment 141 in circumferential direction DR1 and curved member 151 contacts only part of outer surface 142, the area where a high compression stress is applied to stator core segment 141 from curved member 151 is restricted to the area in stator core segment 141 where the flux density is small. In the area where the flux density is small, the iron loss to be produced will be small even if a higher compression stress is exerted thereon. Since a high stress is applied to stator core segment 141 in the area where the flux density is low in correspondence to the distribution of flux density produced in stator core segment 141, and the stress concentrated area is away from the area of high magnetic flux density, the iron loss can be reduced effectively.

Second Embodiment

Figure 8:
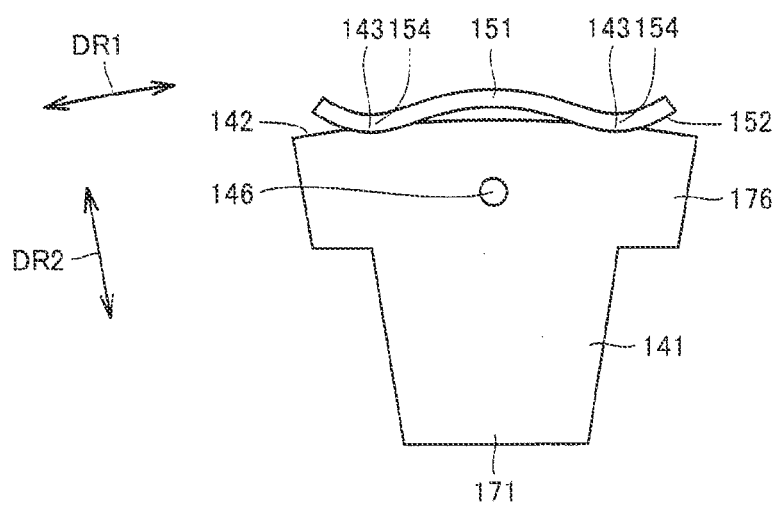
FIG. 8 is a diagram showing a configuration of a stator of a second embodiment.

FIG. 8 is a diagram showing a configuration of a stator of a second embodiment. Stator 140 of the second embodiment differs from the first embodiment in that it includes stator core segment 141 with recesses 143 formed at two positions in outer surface 142 and curved member 151 having projecting portions 154 at two positions corresponding to recesses 143.

Curved member 151 contacts outer surface 142 only on the inner side of two recesses 143, and exerts a compression stress on stator core segments 141 inward in radial direction DR2. With the compression stress applied only partly in circumferential direction DR1, the iron loss produced in stator core segments 141 can be reduced, and a sufficient fastening force for stator core segments 141 can be obtained, similarly to the first embodiment.

In stator core segment 141 of the second embodiment, recesses 143 are formed at two positions in circumferential direction DR1 of stator 140, and the compression stress exerted on stator core segment 141 from curved member 151 is applied at the two positions in circumferential direction DR1.

As compared to the first embodiment, in the first embodiment in which curved member 151 contacts stator core segment 141 only at one position in circumferential direction DR1, curved member 151 may rotate relative to stator core segment 141, as a result of which the positioning accuracy of curved member 151 may be degraded. On the other hand, with stator 140 of the second embodiment, the stress is applied to stator core segment 141 from curved member 151 at two positions in circumferential direction DR1, which prevents displacement of curved member 151 by which curved member 151 would rotate relative to stator core segment 141. Therefore, the positioning accuracy of curved member 151 can further be improved.

Although embodiments of the present invention have been described above, it should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 110 rotation shaft, 120 rotor, 140 stator, 141 stator core segment, 142 outer surface; 143 recess, 146 caulking site, 151 curved member; 152 surface, 154 projecting portion, 155 axial end, 161 link member, 162 air gap, 171 stator teeth, 176 yoke portion, 190 casing, 193 groove portion, 194 covering, 195 wall, 2200 rotating electric machine

The invention claimed is:

1. A stator of a generally hollow cylindrical shape, comprising:
a plurality of stator core segments arranged adjacent to one another in a circumferential direction of said stator and each having an outer surface on the outer side of said stator in a radial direction;
the same number of curved members as said stator core segments, said curved members having a plate shape which is curved in said circumferential direction, and each having a projecting portion curved to project toward said outer surface, contacting said outer surface and pressing said outer surface inward in the radial direction of said stator; and
a wall of a cylindrical shape surrounding an outer circumference of said stator,
said curved members being interposed between said stator core segments and said wall, and
said curved members being sandwiched by said stator core segments and said wall in a flexed state so as to be reduced in size in said radial direction, and exerting an inward stress in said radial direction on said stator core segments and an outward stress in said radial direction on said wall.

2. The stator according to claim 1, wherein a recess is formed in said outer surface, and
said curved members each have said projecting portion received in said recess and contact said outer surface in said recess.

3. The stator according to claim 2, wherein said recess is formed at a central portion in said circumferential direction of said outer surface.

4. The stator according to claim 2, wherein said curved members extend in an axial direction of said stator.

5. The stator according to claim 4, further comprising a link member linking a plurality of said curved members, wherein
said curved members have axial ends and are arranged such that said axial ends do not contact said stator core segments, and
said link member is coupled to said axial ends.

6. A rotating electric machine comprising:
a rotation shaft provided rotatably;
a rotor provided fixedly to said rotation shaft; and
a stator defined in claim 1 arranged around said rotor.

* * * * *